United States Patent
Mitsui et al.

(10) Patent No.: US 9,243,676 B2
(45) Date of Patent: Jan. 26, 2016

(54) SPRING UNIT AND SLIDE MECHANISM

(71) Applicant: MITSUBISHI STEEL MFG. CO., LTD., Tokyo (JP)

(72) Inventors: Yasuhiro Mitsui, Chiba (JP); Toru Hirokane, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/374,581

(22) PCT Filed: Jan. 24, 2013

(86) PCT No.: PCT/JP2013/051504
§ 371 (c)(1),
(2) Date: Jul. 25, 2014

(87) PCT Pub. No.: WO2013/115070
PCT Pub. Date: Aug. 8, 2013

(65) Prior Publication Data
US 2015/0030267 A1    Jan. 29, 2015

(30) Foreign Application Priority Data

Jan. 31, 2012   (JP) ................................. 2012-018743

(51) Int. Cl.
*F16F 3/02* (2006.01)
*F16F 3/10* (2006.01)
(Continued)

(52) U.S. Cl.
CPC ................. *F16F 3/10* (2013.01); *F16C 29/002* (2013.01); *F16F 3/02* (2013.01); *H04M 1/0237* (2013.01)

(58) Field of Classification Search
CPC ................. F16F 3/10; F16F 3/08; F16F 3/12; F16F 3/023; H04M 1/0237

USPC ............... 74/100.2; 267/159, 45, 46, 47, 158, 267/148, 149
See application file for complete search history.

(56) References Cited

U.S. PATENT DOCUMENTS 4,519,591 A * 5/1985 Bush et al. .................... 267/148
2010/0237550 A1   9/2010 Kubota
(Continued)

FOREIGN PATENT DOCUMENTS

CN      102102721      6/2011
CN      102238252      11/2011
(Continued)

OTHER PUBLICATIONS

International Search Report mailed on Apr. 9, 2013.
Extended European Search Report mailed Nov. 6, 2015.

*Primary Examiner* — Melanie Torres Williams
(74) *Attorney, Agent, or Firm* — IPUSA, PLLC

(57) ABSTRACT

A spring unit includes a composite spring and a metal wire. The composite spring is formed of resin, has a single beam structure, and includes a curved part between its end parts. The metal spring is formed of a metal wire, and includes a curved part between its end parts. The end parts of the composite spring are fixed to the corresponding end parts of the metal spring, so that the composite spring and the metal spring are fixed to be positioned in the same plane. The composite spring and the metal spring engage with each other in an engagement part formed in at least one position between the curved parts and the end parts. The composite spring and the metal spring are separated in a part other than the end parts and the engagement part.

5 Claims, 9 Drawing Sheets

(51) Int. Cl.
*H04M 1/02* (2006.01)
*F16C 29/00* (2006.01)

(56) References Cited

U.S. PATENT DOCUMENTS

2011/0287817 A1 11/2011 Liang
2013/0125683 A1* 5/2013 Hazama et al. ............. 74/100.2

FOREIGN PATENT DOCUMENTS

| JP | 2009-133495 | 6/2009 |
| JP | 3161848 U | 8/2010 |
| JP | 2011-244430 | 12/2011 |
| KR | 10-2007-0077542 | 7/2007 |
| WO | 2012/018025 | 2/2012 |
| WO | 2012/026598 | 3/2012 |

* cited by examiner

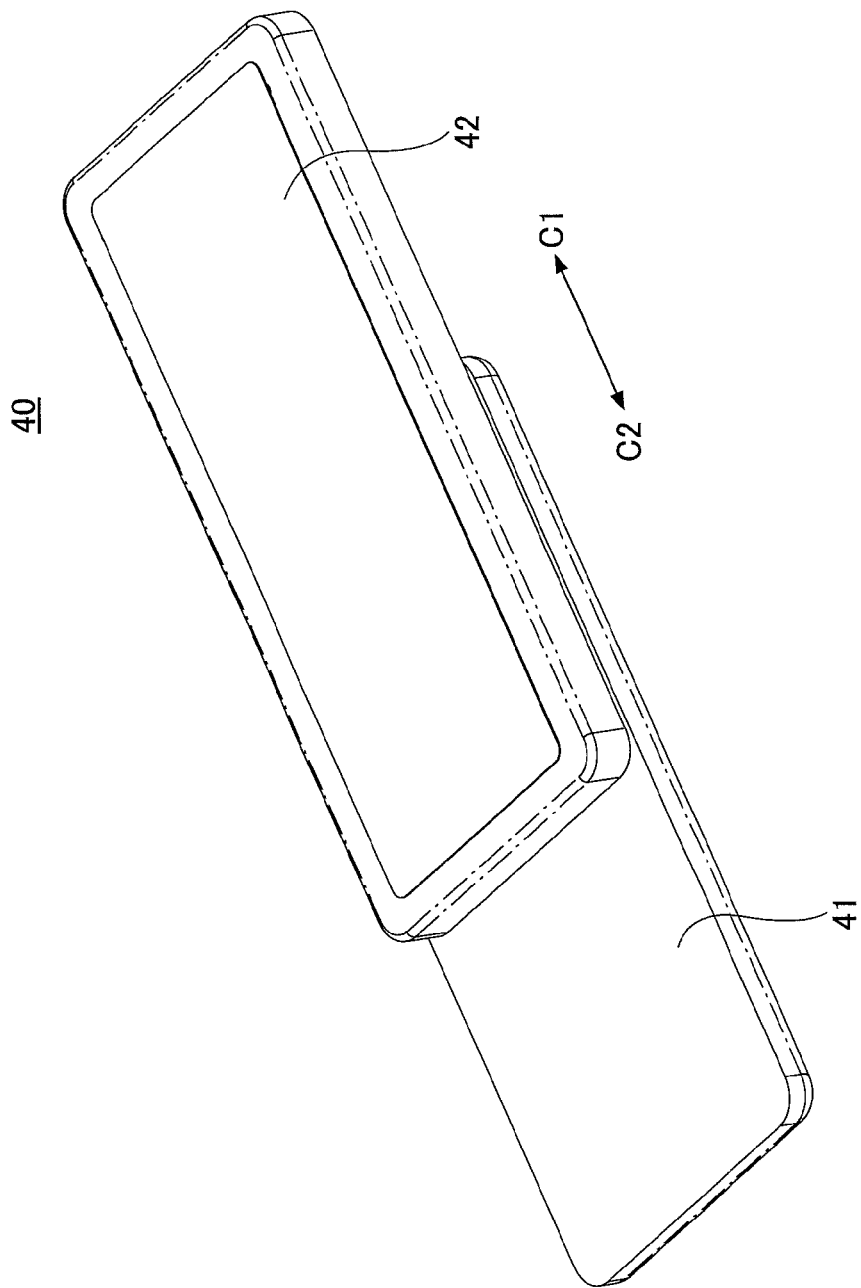

SPRING UNIT AND SLIDE MECHANISM

TECHNICAL FIELD

The present invention relates to spring units and slide mechanisms, and more particular to a spring unit and a slide mechanism that are reduced in thickness.

BACKGROUND ART

Conventionally, as a kind of electronic apparatus, cellular phones and game apparatuses have been provided where a movable housing provided with a liquid crystal display unit, etc., is slidable relative to a stationary housing provided with operations keys and the like. This kind of electronic apparatus includes a built-in slide mechanism that allows the movable housing to slide relative to the stationary housing.

The slide mechanism applied to this electronic apparatus incorporates a spring unit. This slide mechanism moves and urges the movable housing in a closing direction until an operator moves the movable housing to a predetermined position relative to the stationary housing, and urges the movable housing in an opening direction after the operator moves the movable housing to or beyond the predetermined position. This makes it possible to improve the operability of the electronic apparatus.

Furthermore, springs of various structures are used for spring units, among which a spring unit is known that incorporates multiple metal wire springs (see Patent Document 1). According to the spring unit disclosed in Patent Document 1, in order to increase a load relative to the amount of displacement, multiple (three) wire springs are arranged at equal intervals and their end portions are connected to a housing of an electronic apparatus using connecting members.

PRIOR ART DOCUMENT

Patent Document

[Patent Document 1] Japanese Laid-Open Patent Application No. 2009-133495

SUMMARY OF THE INVENTION

Problems to be Solved by the Invention

A weight increase, however, is a problem to the spring unit that incorporates multiple metal wire springs. Furthermore, while a smaller number of wire springs are preferable to reduce the size of the spring unit, there is a problem in that the number of wire springs inevitably increases in the conventional spring unit to cause an increase in the size of the spring unit when the load applied to the spring unit is large.

The present invention is made in view of the above-described points, and has an object of providing a spring unit and a slide mechanism that are reduced in size and are capable of accommodating high loads.

Means for Solving the Problems

According to an aspect of the present invention, a spring unit includes a composite spring formed of resin and having a single beam structure, the composite spring including a curved part between its end parts, and a metal spring formed of a metal wire, the metal spring including a curved part between its end parts. The end parts of the composite spring are fixed to the corresponding end parts of the metal spring, so that the composite spring and the metal spring are fixed to be positioned in the same plane. The composite spring and the metal spring engage with each other in an engagement part formed in at least one position between the curved parts and the end parts. The composite spring and the metal spring are separated in a part other than the end parts and the engagement part.

According to an aspect of the present invention, a slide mechanism includes a base plate, a sliding plate slidably attached to the base plate, and the spring unit as set forth above. The spring unit is provided between the base plate and the sliding plate to urge the sliding plate in a direction to slide relative to the base plate.

Effects of the Invention

According to an aspect of the present invention, it is possible to reduce the weight of a spring unit because of its inclusion of a composite spring, which is lighter than metal. Furthermore, it is possible to improve a spring characteristic by causing the composite spring and a metal spring to interfere with each other by forming an engagement part where the composite spring and the metal spring engage with each other between their curved parts and end parts.

BRIEF DESCRIPTION OF THE DRAWINGS

FIG. 5A is a perspective view of an electronic apparatus with the slide mechanism that is an embodiment of the present invention, illustrating an open state of the electronic apparatus.

DESCRIPTION OF EMBODIMENTS

Next, a description is given, with reference to the accompanying drawings, of embodiments of the present invention.

Figure 1A:
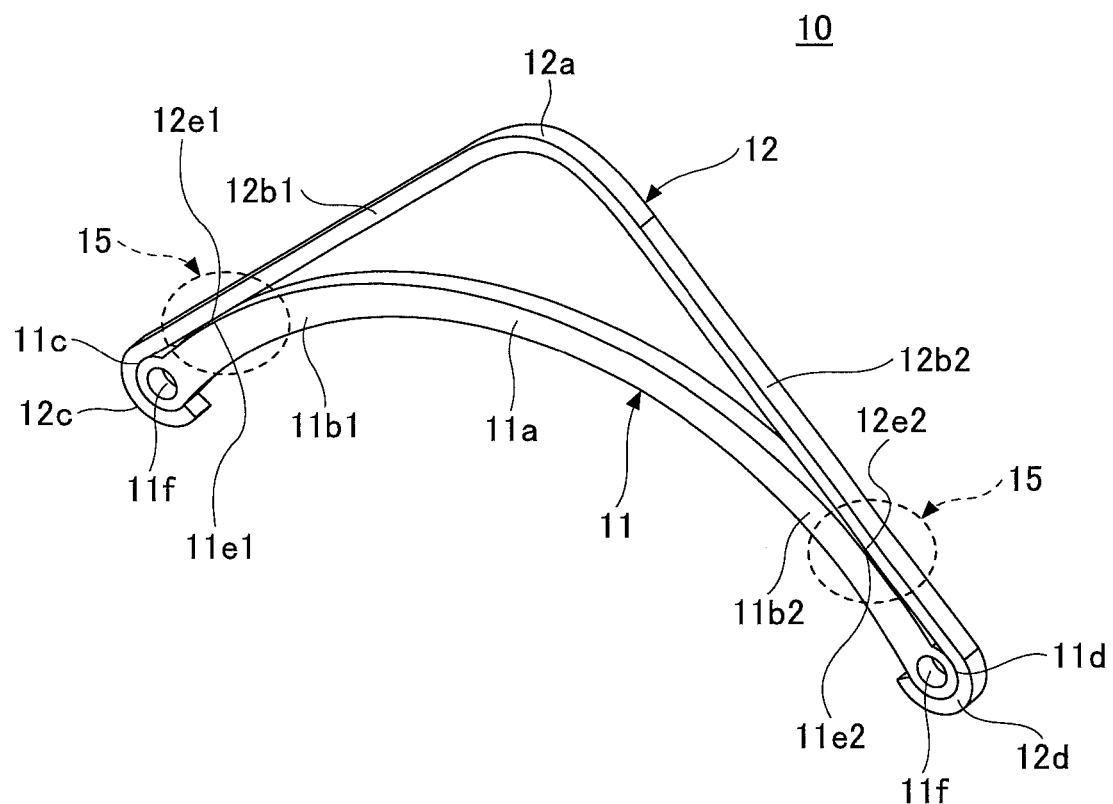
FIG. 1A is a perspective view of a spring unit that is an embodiment of the present invention.
Figure 1B:
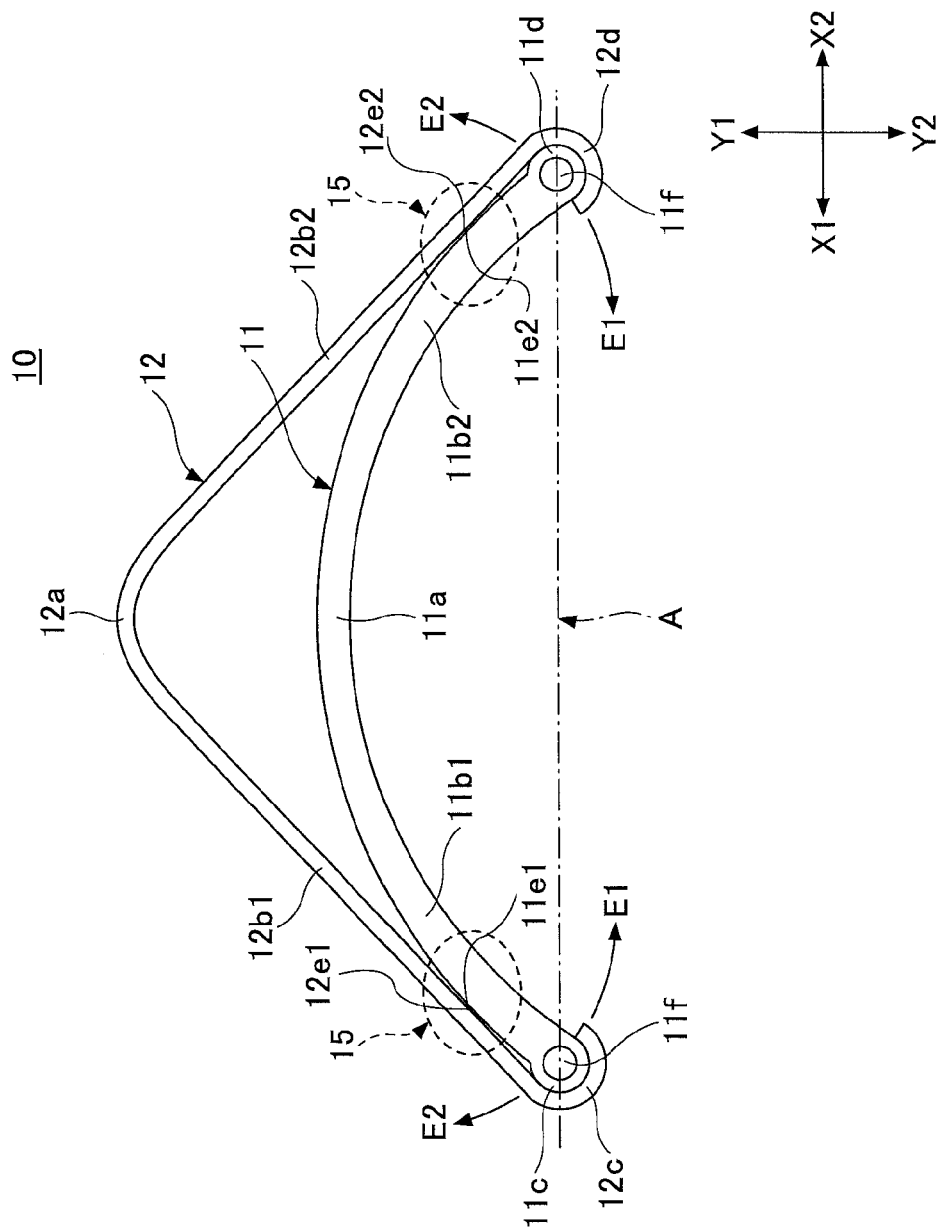
FIG. 1B is a plan view of the spring unit that is an embodiment of the present invention.

FIGS. 1A and 1B are diagrams for illustrating a spring unit 10 that is an embodiment of the present invention. FIG. 1A is a perspective view of the spring unit 10. FIG. 1B is a plan view of the spring unit 10.

The spring unit 10 of this embodiment includes a single composite spring 11 and a single metal spring 12. This spring unit 10 is applied as an actuator to a slide mechanism 20 (see FIGS. 4A and 4B) mounted on electronic apparatuses such as cellular phones, game apparatuses, etc.

First, a description is given of the composite spring 11.

Figure 2A:
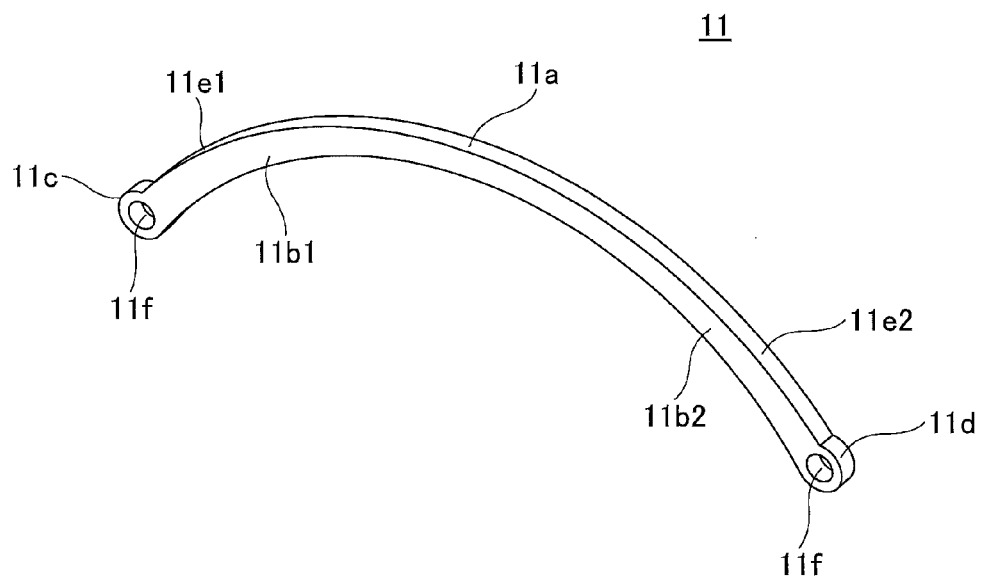
FIG. 2A is a perspective view of a composite spring of the spring unit that is an embodiment of the present invention.
Figure 2B:
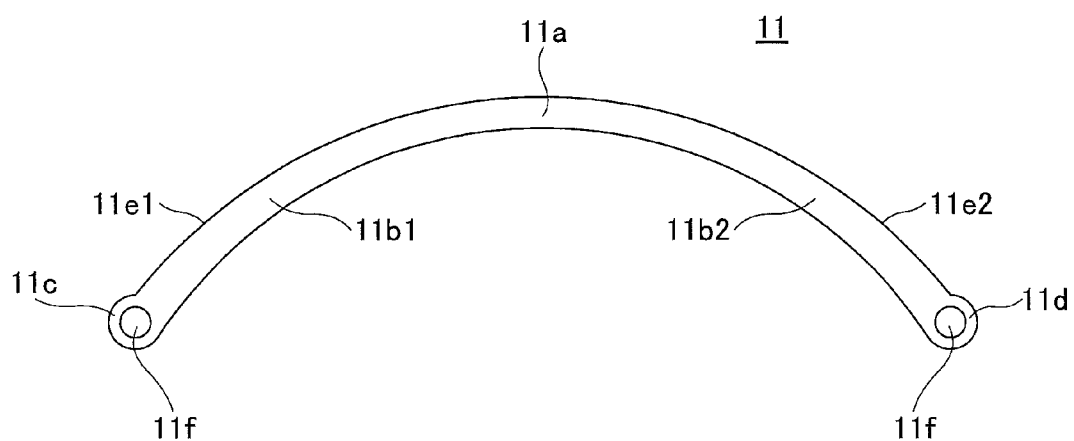
FIG. 2B is a plan view of the composite spring of the spring unit that is an embodiment of the present invention.

FIG. 2A is a perspective view of the composite spring 11. FIG. 2B is a plan view of the composite spring 11. The composite spring 11 is a monolithically molded article of an elastically deformable resin. This composite spring 11 includes a pair of end parts 11c and 11d (the end part 11c in the X1 direction and the end part 11d in the X2 direction in FIG. 1B) and a curved part 11a formed between the end parts 11c and 11d.

Furthermore, the composite spring 11 includes extending parts 11b1 and 11b2 formed between the curved part 11a and the end part 11c and between the curved part 11a and the end part 11d, respectively. Therefore, the composite spring 11 as a whole has an arc shape.

Furthermore, the composite spring 11 has a single beam structure. Here, the single beam structure refers to a structure of a single beam without a hole formed between the one end part 11c and the other end part 11d.

Furthermore, according to this embodiment, the composite spring 11 has substantially the same cross-sectional area between the end parts 11c and 11d. It is possible, however, to suitably change the cross-sectional area in order to adjust the spring characteristic of the composite spring 11.

Furthermore, according to this embodiment, polyether ether ketone (PEEK) is used as the material of the composite spring 11. PEEK has good fatigue resistance, abrasion resistance, size stability, chemical resistance, etc., and also has good processability. Therefore, PEEK is effective as the material of the composite spring 11. The material of the composite spring 11, however, is not limited to PEEK, and other resin materials may also be used.

Pin insertion holes 11f for inserting pins 17a and 17b (see FIGS. 4A and 4B) for attaching the spring unit 10 to a base plate 21 and a sliding plate 22 of the below-described slide mechanism 20 are formed in the respective central parts of the end parts 11c and 11d. Furthermore, end parts 12c and 12d (see FIGS. 3A and 3B) of the below-described metal spring 12 are fixed to the peripheral portions of the end parts 11c and 11d, respectively.

Furthermore, interference parts 11e1 and 11e2 forming engagement parts 15 (see FIGS. 1A and 1B) described below are formed on the outer side (Y1 side in FIG. 1B) of a portion of the extending part 11b1 near the end part 11c and on the outer side (Y1 side in FIG. 1B) of a portion of the extending part 11b2 near the end part 11d, respectively. For example, these interference parts 11e1 and 11e2 are formed at positions closer to the end parts 11c and 11d, respectively, than the intermediate positions between the curved part 11a and each of the end parts 11c and 11d.

Next, a description is given of the metal spring 12.

Figure 3A:
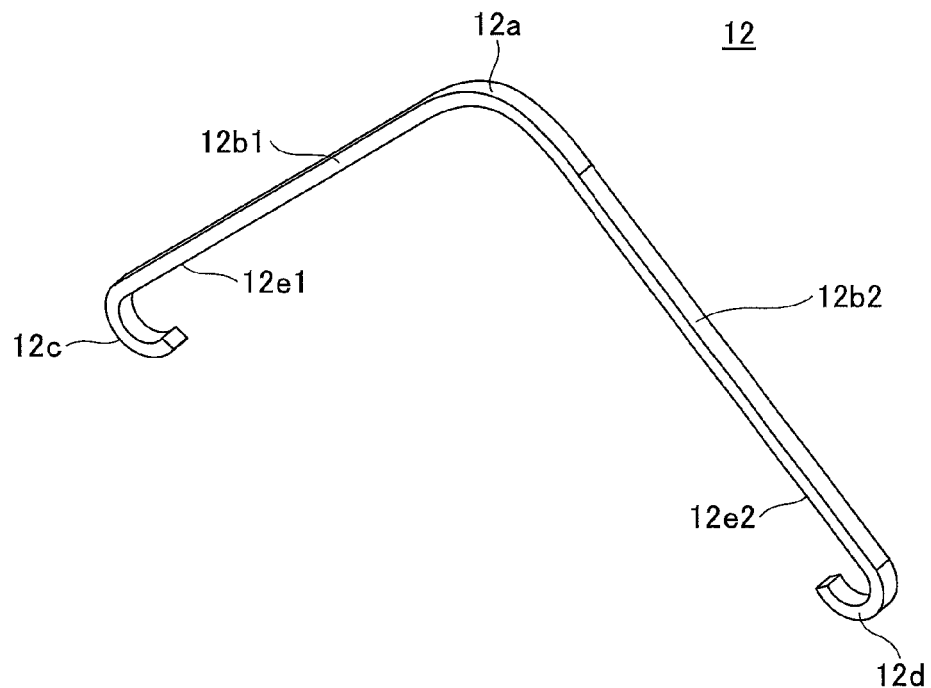
FIG. 3A is a perspective view of a metal spring of the spring unit that is an embodiment of the present invention.
Figure 3B:
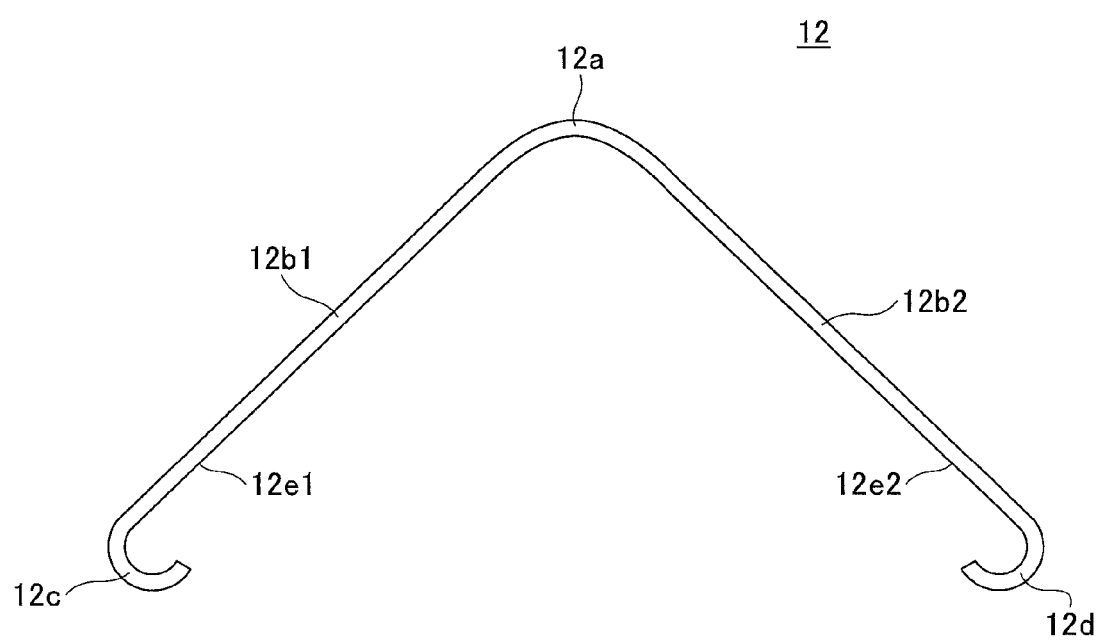
FIG. 3B is a plan view of the metal spring of the spring unit that is an embodiment of the present invention.

FIG. 3A is a perspective view of the metal spring 12. FIG. 3B is a plan view of the metal spring 12. The metal spring 12 is a wire spring formed by shaping wire of a spring material such as spring steel. This metal spring 12 includes a pair of end parts 12c and 12d (the end part 12 in the X1 direction and the end part 12d in the X2 direction in FIG. 1B) and a curved part 12a formed at the substantially middle position between the end parts 12c and 12d.

Furthermore, the metal spring 12 includes substantially linear extending parts 12b1 and 12b2 formed between the curved part 12a and the end part 12c and between the curved part 12a and the end part 12d, respectively. Therefore, the metal spring 12 as a whole has a substantially "dogleg" shape.

The curvature of the curved part 12a of this metal spring 12 and the curvature of the curved part 11a of the above-described composite spring 11 may be suitably determined. Furthermore, the curvatures of the curved parts 11a and 12a may be equal to or different from each other.

According to this embodiment, the metal spring 12 has a rectangular cross-sectional shape (see FIG. 3A). The cross-sectional shape of the metal spring 12, however, is not limited to this shape, and the metal spring 12 may have other cross-sectional shapes such as a circular shape, a barrel shape, or an elliptic shape.

Furthermore, interference parts 12e1 and 12e2 forming the engagement parts 15 (see FIGS. 1A and 1B) described below are formed on the inner side (Y2 side in FIG. 1B) of a portion of the extending part 12b1 near the end part 12c and on the inner side (Y2 side in FIG. 1B) of a portion of the extending part 12b2 near the end part 12d, respectively. For example, these interference parts 12e1 and 12e2 are formed at positions closer to the end parts 12c and 12d, respectively, than the intermediate positions between the curved part 12a and each of the end parts 12c and 12d.

The composite spring 11 and the metal spring 12 configured as described above are combined and integrated into the spring unit 10 by fixing the end parts 12c and 12d of the metal spring 12 and the end parts 11c and 11d of the composite spring 11.

In this case, the end parts 12c and 12d of the metal spring 12 are attached approximately 180° around the end parts 11c and 11d of the composite spring 11, respectively, so that the end parts 11c and 11d of the composite spring 11 and the end parts 12c and 12d of the metal spring 12 are fixed.

Furthermore, in the spring unit 10 according to this embodiment, when it is assumed that the end parts 11c and 12c of the composite spring 11 and the metal spring 12, respectively, and the end parts 11d and 12d of the composite spring 11 and the metal spring 12, respectively, face each other on the "inside" of the composite spring 11, the metal spring 12 is provided on the "outside" of the composite spring 11. In other words, the metal spring 12 is provided in the Y1 direction of the composite spring 11 (see FIG. 1B). Furthermore, the spring unit 10 is configured so that the integrated composite spring 11 and metal spring 12 are positioned in the same plane. This configuration makes it possible to have the spring unit 10 reduced in thickness.

Here, the "same plane" refers to a plane that is perpendicular to the central axes of the pin insertion holes 11f and includes a line segment that connects the centers of the pin insertion holes 11f (a one-dot chain line indicated by arrow A in FIG. 1B).

Furthermore, unlike the conventional spring unit formed only of metal wires, the spring unit 10 according to this embodiment employs the lightweight composite spring 11 as part of the springs. Therefore, it is possible to have the spring unit 10 reduced in weight.

Next, a description is given of the slide mechanism 20 incorporating the spring unit 10, which is an embodiment of the present invention.

Figure 4A:
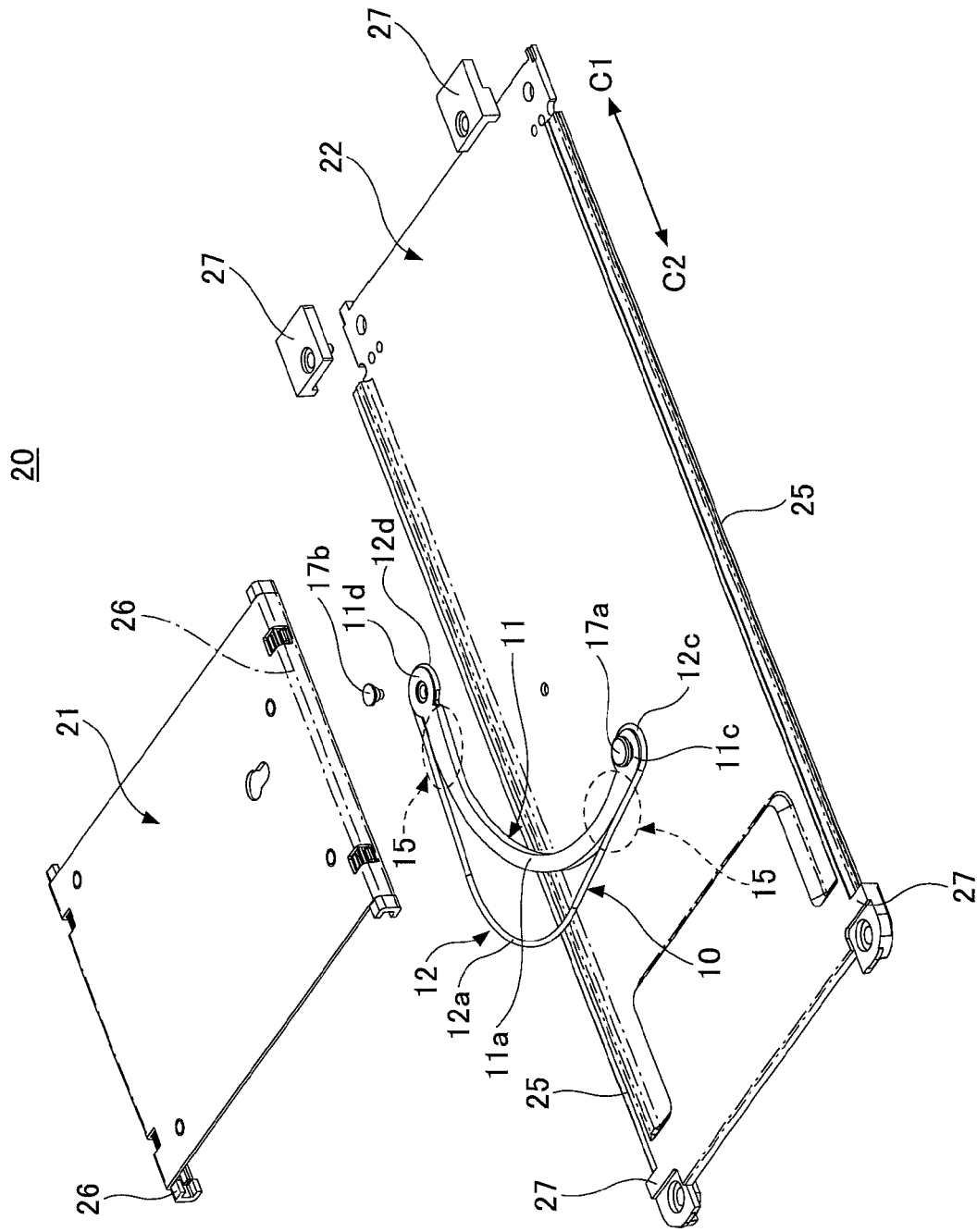
FIG. 4A is an exploded perspective view of a slide mechanism that is an embodiment of the present invention.
Figure 4B:
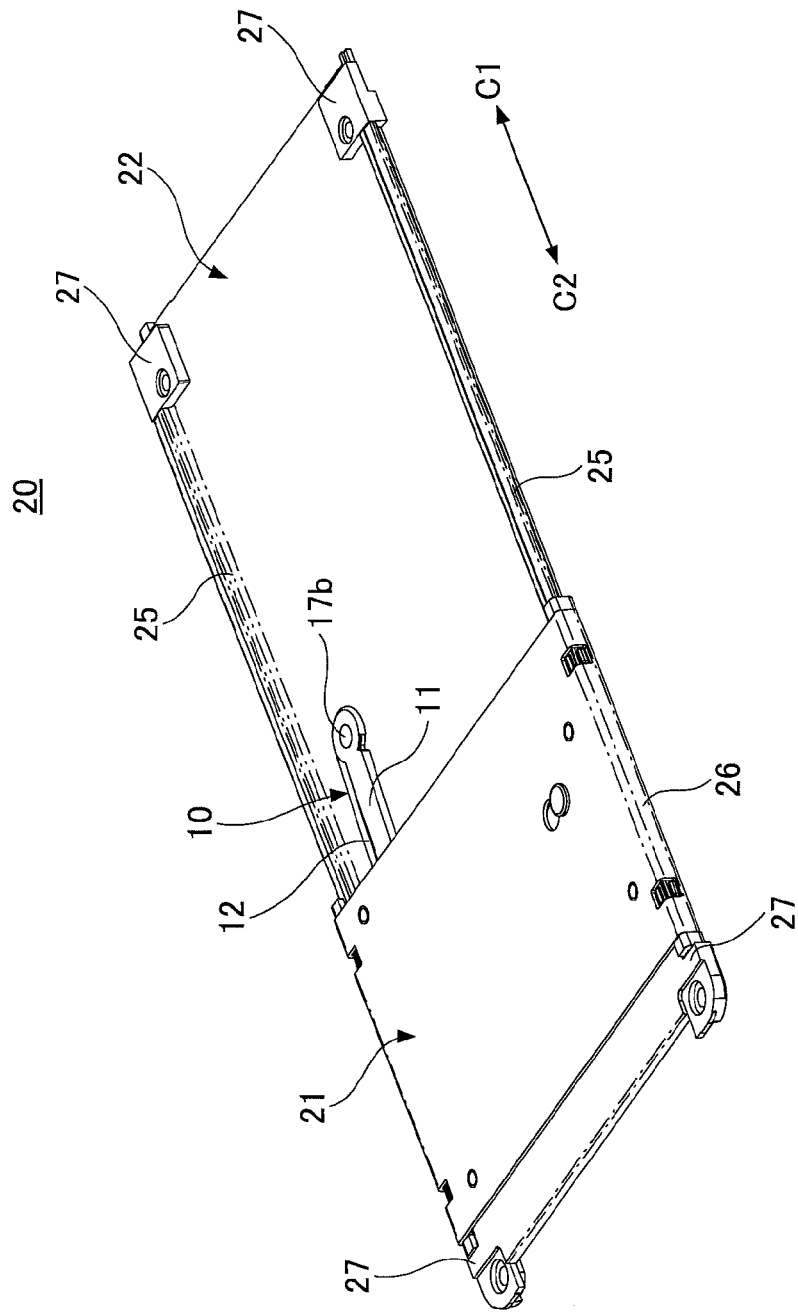
FIG. 4B is a perspective view of the slide mechanism that is an embodiment of the present invention.
Figure 5B:
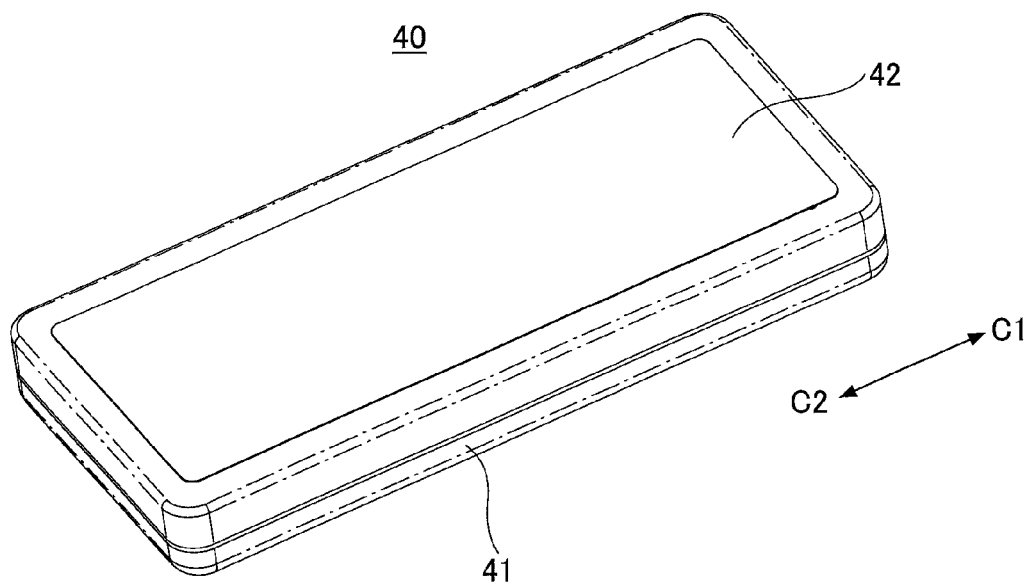
FIG. 5B is a perspective view of the electronic apparatus with the slide mechanism that is an embodiment of the present invention, illustrating a closed state of the electronic apparatus.

FIGS. 4A and 4B illustrate the slide mechanism 20 that incorporates the spring unit 10. FIG. 4A is an exploded perspective view of the slide mechanism. FIG. 4B is a perspective view of the assembled slide mechanism 20. Further, FIGS. 5A and 5B illustrate an electronic apparatus 40 that incorporates the slide mechanism 20.

The slide mechanism 20 includes the base plate 21, the sliding plate 22, and the spring unit 10. This slide mechanism 20 is applied to, for example, the electronic apparatus 40 such as a cellular phone or the like where a second housing 42 slides relative to a first housing 41 as illustrated in FIGS. 5A and 5B.

The base plate 21 is fixed to the first housing 41 provided with various keys and the like of the electronic apparatus 40. The sliding plate 22 is fixed to the second housing 42 provided with a liquid crystal display unit, etc.

Guide members 26 are provided one on each side of the base plate 21. The guide members 26 are formed to extend in the directions of arrow C1 and C2 in FIGS. 4A and 4B. Side edge parts 25 that extend on both sides of the sliding plate 22 in the longitudinal direction are configured to slidably engage with the guide members 26. This allows the sliding plate 22 to slide in the C1 and the C2 direction relative to the base plate 21.

The spring unit 10 has the end parts 11c and 12c at one end rotatably connected to the base plate 21 by the pin 17a, and has the end parts 11d and 12d at the other end rotatably connected to the sliding plate 22 by the pin 17b. This causes the elastic force of the spring unit 10 to be exerted between the base plate 21 and the sliding plate 22.

The sliding plate 22 is provided with stoppers 27 that come into contact with the base plate 21 to prevent a further movement of the sliding plate 22 when the sliding plate 22 moves to an end position in a C1 direction and to an end position in a C2 direction relative to the base plate 21.

FIG. 4B and FIG. 5A illustrate an open state where the second housing 42 is open relative to the first housing 41. In this open state, the sliding plate 22 is slid in the C1 direction relative to the base plate 21. In this open state, the spring unit 10 exerts an elastic force so as to move and urge the sliding plate 22 in the C1 direction relative to the base plate 21.

When the second housing 42 is caused to move in the direction of arrow C2 from this open state, the pins 17a and 17b gradually approach each other, so that the end parts 11c and 12c and the end parts 11d and 12d of the spring unit 10 also gradually approach each other. As a result, the composite spring 11 and the metal spring 12 elastically deform to reduce the bend angles of their respective curved parts 11a and 12a to accumulate elastic forces.

Letting the state where the composite spring 11 and the metal spring 12 are most contracted (deformed) be an intermediate state, the elastic force generated by the spring unit 10 is exerted to cause the sliding plate 22 to move in the C1 direction relative to the base state 21 during the transition of the sliding plate 22 from the open state to this intermediate state. Therefore, when an operation of moving the sliding plate 22 is stopped before the sliding plate 22 reaches the intermediate state, the sliding plate 22 is caused to return to the open state by the elastic force generated by the spring unit 10.

On the other hand, when the slide plate 22 is caused to slide further in the C2 direction than the intermediate state, the direction in which the spring unit 10 exerts the elastic force on the sliding plate 22 is reversed, so that the elastic force of the spring unit 10 is exerted in a direction to close the sliding plate 22 relative to the base plate 21 (the direction of arrow C2 in FIGS. 4A through 5B).

Therefore, when the sliding plate 22 is caused to slide further in the C2 direction than the intermediate state, the sliding plate 22 thereafter slides automatically to a closed state (the state illustrated in FIG. 4B) even without being operated because of the elastic force generated by the spring unit 10. Thus, the spring unit 10 operates as a so-called semiautomatic slide mechanism. The operation of bringing back the sliding plate 22 to the open state from the closed state is opposite to the above-described operation.

Here, a description is given of an operation of the spring unit 10 according to this embodiment used as described above.

FIGS. 1A and 1B illustrate a state where no load is applied to the spring unit 10 (hereinafter referred to as "unloaded state"). In this unloaded state, each of the composite spring 11 and the metal spring 12 is displaced in directions indicated by arrows E2 in FIG. 1B.

In positions near the end parts 11c and 12c and the end parts 11d and 12d of the composite spring 11 and the metal spring 12 in the unloaded state, the spring unit 10 according to this embodiment has the engagement parts 15, where the composite spring 11 and the metal spring 12 engage with each other, formed so that at least one of the engagement parts 15 is positioned between the curved parts 11a and 12a and the end parts 11c and 12c and at least one of the engagement parts 15 is positioned between the curved parts 11a and 12a and the end parts 11c and 12c. That is, the composite spring 11 and the metal spring 12 engage with each other in at least one position between the curved parts 11a and 12a and the end parts 11c and 12c and in at least one position between the curved parts 11a and 12a and the end parts 11d and 12d.

In these engagement parts 15, the above-described interference parts 11e1 and 11e2 of the composite spring 11 and the above-described interference parts 12e1 and 12e2 of the metal spring 12 engage with each other. The interference parts 11e1 and 11e2 and the interference parts 12e1 and 12e2 are not fixed but are in contact in a displaceable manner relative to each other.

Furthermore, the spring unit 10 is configured so that the composite spring 11 and the metal spring 12 are separated from each other at positions other than the position at which the end part 12c is attached to the end part 11c, the position at which the end part 12d is attached to the end part 11d, and the positions at which the interference parts 11e1 and 11e2 engage with the interference parts 12e1 and 12e2, respectively, to form the engagement parts 15. In this portion of the spring unit 10 where the composite spring 11 and the metal spring 12 are separated, the composite spring 11 and the metal spring 12 are prevented from interfering with each other.

In the spring unit 10 thus configured, when loads are applied to the end parts 11c and 12c and the end parts 11d and 12d in directions indicated by arrows E1 in FIG. 1B, each of the composite spring 11 and the metal spring 12 elastically deforms in the directions of arrows E1 (in directions in which the end parts 11c and 12c and the end parts 11d and 12d approach each other).

At this point, because the engagement parts 15, where the composite spring 11 and the metal spring 12 engage to interfere with each other, are formed in the spring unit 10 according to this embodiment, the deformations of the composite spring 11 and the metal spring 12 due to the applied loads are different from those in the case where the composite spring 11 and the metal spring 12 are independent because of their mutual interference in the engagement parts 15. As a result, it is possible to distribute stress concentration, so that it is possible to increase loads.

Figure 6:
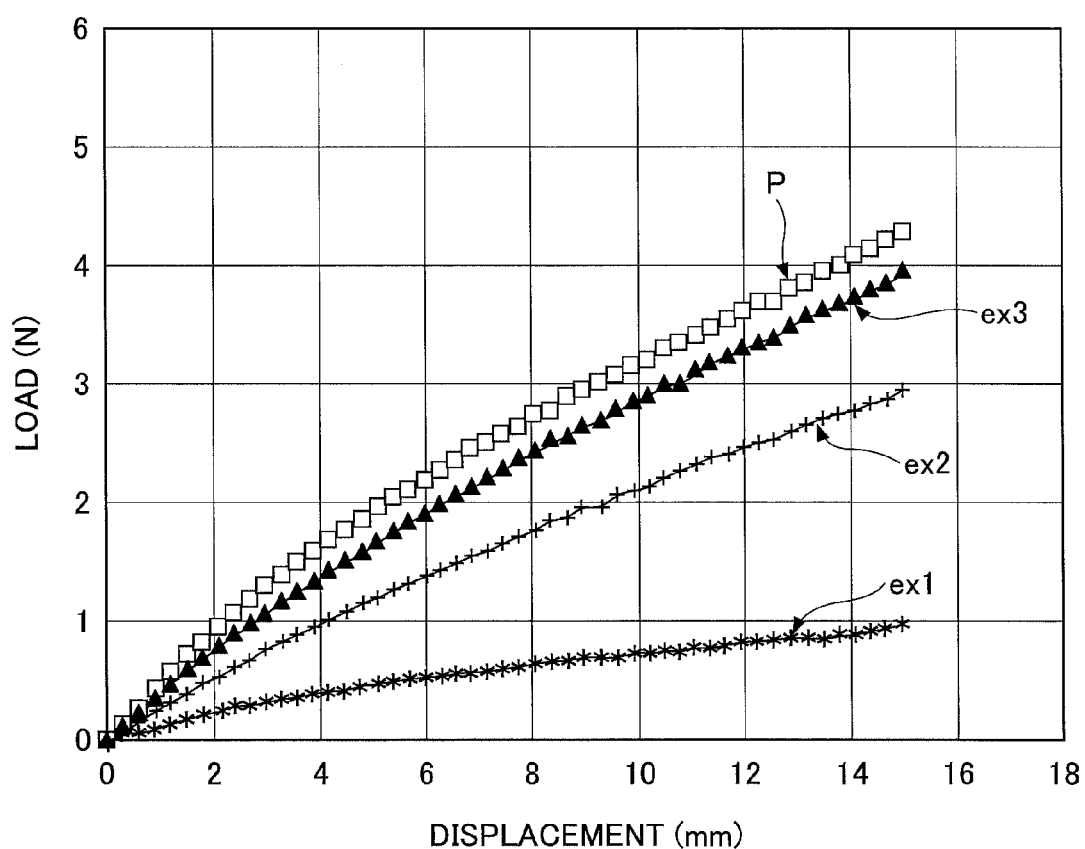
FIG. 6 is a graph illustrating a spring characteristic of the spring unit that is an embodiment of the present invention along with comparative examples.

FIG. 6 is a graph for illustrating a spring characteristic of the spring unit 10 according to this embodiment.

In FIG. 6, the characteristic of the spring unit 10 according to this embodiment is indicated by arrow P. Further, FIG. 6 also illustrates the spring characteristic of the composite spring 11 alone (indicated by arrow ex1 in the drawing), the spring characteristic of the metal spring 12 alone (indicated by arrow ex2 in the drawing), and the spring characteristic of a spring unit where the metal spring 12 is attached to the composite spring 11 without the engagement parts 15 (indicated by arrow ex3 in the drawing) as comparative examples. In FIG. 6, the horizontal axis represents a displacement (mm) and the vertical axis represents a load (N).

FIG. 6 shows that according to the spring characteristic P of the spring unit 10 according to this embodiment, there is a significant increase in the load relative to the displacement compared with the spring characteristic ex1 of the composite spring 11 alone and the spring characteristic ex2 of the metal spring 12 alone.

The spring characteristic ex3 of the spring unit without the engagement parts 15 is better than the spring characteristic ex1 of the composite spring 11 alone and the spring characteristic ex2 of the metal spring 12 alone. The load relative to the displacement, however, is greater according to the spring characteristic P of the spring unit 10 of this embodiment than according to the spring characteristic ex3 of the spring unit without the engagement parts 15.

Thus, it has been demonstrated by FIG. 6 that it is possible for the spring unit 10 according to this embodiment to accommodate high loads even with a simple configuration formed only of the composite spring 11 and the metal spring 12. Thus, it is possible for the spring unit 10 of this embodiment to accommodate high loads in spite of its downsized configuration formed of the composite spring 11 and the metal spring 12.

In the spring unit 10 according to this embodiment, one engagement part 15 is provided between the curved parts 11a and 12a and the end parts 11c and 12c and one engagement part 15 is provided between the curved parts 11a and 12a and the end parts 11d and 12d. The number of engagement parts 15 to be provided, however, is not limited to this, and two or more engagement parts 15 may be provided between the curved parts 11a and 12a and the end parts 11c and 12c and two or more engagement parts 15 may be provided between the curved parts 11a and 12a and the end parts 11d and 12d.

Furthermore, the number of engagement parts 15 to be provided between the curved parts 11a and 12a and the end parts 11c and 12c and the number of engagement parts 15 to be provided between the curved parts 11a and 12a and the end parts 11d and 12d may be different.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

The present application is based upon and claims the benefit of priority of Japanese Patent Application No. 2012-018743, filed on Jan. 31, 2012, the entire contents of which are incorporated herein by reference.

DESCRIPTION OF THE REFERENCE NUMERALS 10 spring unit
11 composite spring
12 metal spring
11a, 12a curved part
11b1, 11b2, 12b1, 12b2 extending part
11c, 11d, 12c, 12d end part
11e1, 11e2, 12e1, 12e2 interference part
11f pin insertion hole
15 engagement part
17a, 17b pin
20 slide mechanism
21 base plate
22 sliding plate
40 electronic apparatus
41 first housing
42 second housing

The invention claimed is:

1. A spring unit, comprising:
a composite spring formed of resin and having a single beam structure, the composite spring including a curved part between end parts thereof; and
a metal spring formed of a metal wire, the metal spring including a curved part between end parts thereof,
wherein the end parts of the composite spring are fixed to the corresponding end parts of the metal spring, so that the composite spring and the metal spring are fixed to be positioned in a same plane,
the composite spring and the metal spring engage with each other in an engagement part formed in at least one position between the curved parts and the end parts, and
the composite spring and the metal spring are separated in a part other than the end parts and the engagement part.

2. The spring unit as claimed in claim 1, wherein the engagement part is positioned closer to the end part of the composite spring than an intermediate position between the curved part and the end part of the composite spring.

3. The spring unit as claimed in claim 1, wherein the engagement part is positioned closer to the end part of the metal spring than an intermediate position between the curved part and the end part of the metal spring.

4. The spring unit as claimed in claim 1, wherein the metal spring is fixed to the composite spring by attaching the end parts of the metal spring around peripheral portions of the corresponding end parts of the composite spring.

5. A slide mechanism, comprising:
a base plate;
a sliding plate slidably attached to the base plate; and
the spring unit as set forth in claim 1, the spring unit being provided between the base plate and the sliding plate to urge the sliding plate in a direction to slide relative to the base plate.

* * * * *